April 17, 1951     W. J. WINNINGHOFF     2,549,355
FLUORESCENT LAMP
Filed Feb. 28, 1948     2 Sheets—Sheet 1
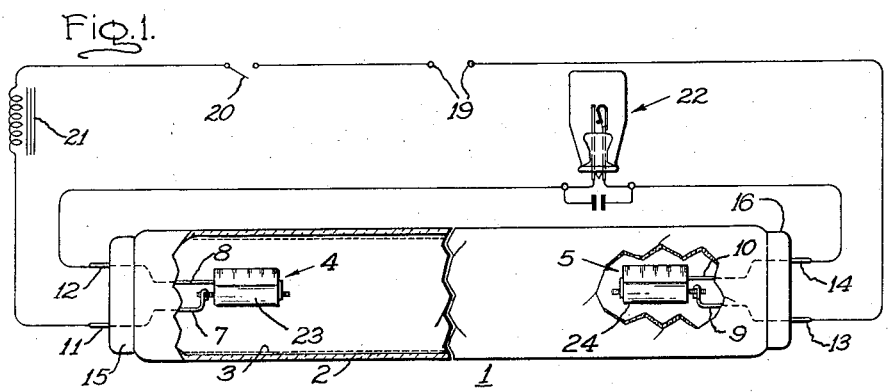
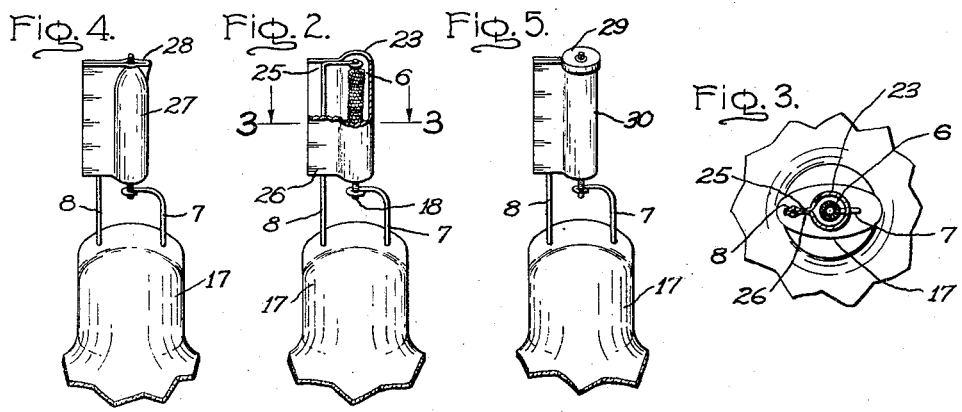
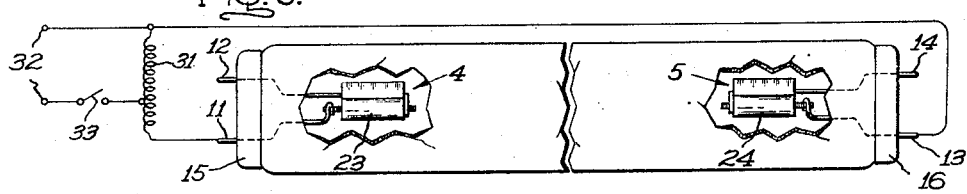
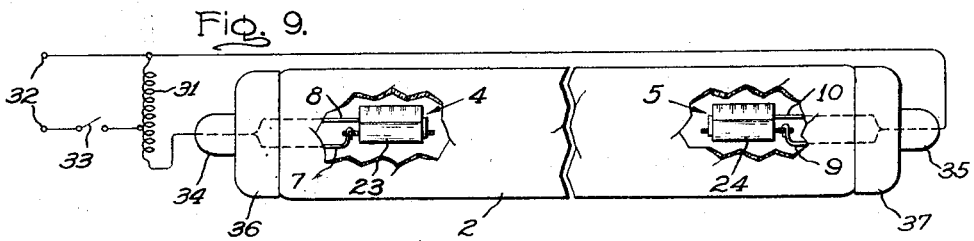
Inventor:
Wilford J. Winninghoff,
by Vernet C. Kauffman
His Attorney.

April 17, 1951  W. J. WINNINGHOFF  2,549,355
FLUORESCENT LAMP
Filed Feb. 28, 1948  2 Sheets-Sheet 2
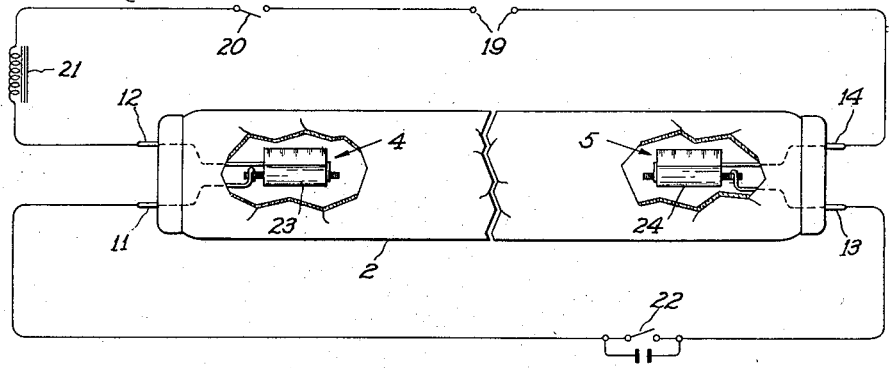
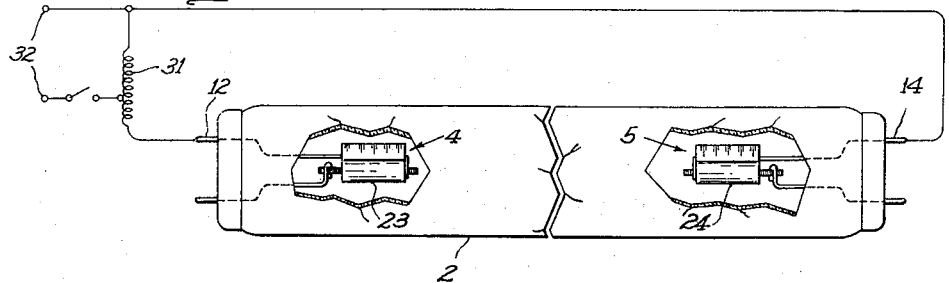
Inventor:
Wilford J. Winninghoff,
by Vernet C. Kauffman
His Attorney.

Patented Apr. 17, 1951

2,549,355

UNITED STATES PATENT OFFICE 2,549,355

FLUORESCENT LAMP

Wilford J. Winninghoff, Cleveland Heights, Ohio, assignor to General Electric Company, a corporation of New York Application February 28, 1948, Serial No. 11,932

11 Claims. (Cl. 176—122)

My invention relates to low pressure positive column electric discharge devices, and more particularly to positive column fluorescent lamps. This application is a continuation-in-part of my application Serial No. 745,943, filed May 5, 1947, now abandoned.

Many of the prior art low pressure positive column discharge devices, such as fluorescent lamps, employ activated electrodes at the ends of relatively long tubular envelopes, and due to the electrode configuration or design the luminosity of the lamps has not been uniform over the entire length, there being regions of relatively low intensity at the ends of the envelope immediately adjacent the stem press or bases. In addition to the electrode configuration, which has caused this reduction of luminosity at the ends, the nature of the arc discharge at the electrodes has also been effective to augment this undesirable feature. That is, the electrode constructions have generally been such that the boundary region between an electrode acting as a cathode and the highly luminous positive column portion of the arc has caused reductions in the intensity of radiation immediately in front of the electrode. Even though the lamps are operated on alternating current, the lower light intensity at the lamps ends has been noticeable. With the exception of the type of electrode construction disclosed and claimed in United States Patent 2,020,723, granted November 12, 1935 upon an application of T. E. Foulke, and which is assigned to the assignee of this application, the electrode construction has been such that the boundary region produces the above-described undesirable reductions in intensity near the lamp ends.

Certain of the prior art lamp constructions have been subject to disadvantages with respect to the production of end-discoloration or end-blackening occasioned by the dislodging of particles from the electrodes during operation, which particles are conveyed to localized regions on the enclosing envelope around the electrodes providing a surface to which the mercury adheres and which causes a reduction in light intensity at the lamp ends as the life of the lamps progresses. In accordance with my invention described hereinafter, I provide new and improved lamp constructions wherein the end regions of low intensity are substantially eliminated and wherein the lamp envelope during operation exhibits a substantially uniform light intensity throughout its entire length. In addition, I provide electrode constructions which prevent and substantially eliminate end-discoloration which otherwise would be entailed by electrode deterioration.

It is an object of my invention to provide a new and improved low pressure positive column fluorescent lamp.

It is another object of my invention to provide a new and improved fluorescent lamp wherein electrode deterioration and incident end-discoloration are substantially eliminated.

It is a still further object of my invention to provide a new and improved electrode construction for fluorescent lamps by virtue of which lamp performance is improved and whereby a substantial improvement in lamp life is obtained.

It is a still further object of my invention to provide a new and improved positive column fluorescent lamp which is capable of providing a satisfactory life either on preheat or instant-start type operating circuits.

Generally speaking, it may be stated that one of the principal causes for end-discoloration or end-blackening has been the slow disintegration or deterioration of an electrode by ion bombardment during starting due to which phenomenon particles of the activating material of the electrode or of the electrode itself become dislodged and travel to the inner surfaces at the ends of the lamps, at which positions, and due to the accumulation of dislodged material and mercury, there is effected a substantial reduction in luminosity at the ends of the lamps. This dislodging of activating material from the electrodes also entails a further undesirable feature in fluorescent lamp operation sometimes referred to as spiraling. Spiraling may be considered to be a result of the accumulation of negatively charged particles collecting in the arc stream. One of the common sources of such particles is the aforementioned material dislodged from the electrode during starting due to the ion bombardment because of the fact that the filament temperature has not reached the value which assures the emission of sufficient electrons therefrom to meet the current requirements of the lamp and the circuit to which the lamp is connected. Although the exact phenomenon taking place in the boundary region immediately in front of an electrode when operating as a cathode has been the subject matter of considerable discussion, it can be stated with reasonable certainty that the heating effect and the consequent localized cathode spots causing cathode deterioration during starting are present in circuits employing electrode preheating as well as in instant-start circuits.

The regions of relatively low intensity or low luminosity at the ends of the lamps are further accentuated by many of the prior art electrode constructions wherein the boundary regions further reduce the light output immediately in front of and around the electrodes. The various portions of electric discharges in gases or vapors may be roughly divided into several well-recognized regions or zones. Adjacent to the cathode is a dark space commonly referred to as the cathode dark space. This is followed by a luminous zone known as the negative or cathodic glow. The next zone is relatively dark resembling the Faraday dark space of glow discharges. The remaining part of the discharge, and meeting the boundary zone, is highly luminous and is known as the positive column, and in the case of the now conventional fluorescent lamp is considered as the primary source of the 2537 Angstrom unit line radiation which excites a fluorescent material to produce visible radiation.

In many types of positive column fluorescent lamps, regions of discoloration have been formed on the inside of the enclosing envelopes immediately in front of the electrode structure. These regions of discoloration have been sometimes referred to as bands or rings and are positioned at the head of the positive column, i. e., these bands are at approximately the position where the positive column meets the dark space corresponding to the Faraday dark space.

In accordance with my invention I provide a new and improved fluorescent lamp, and particularly electrode constructions therefor, wherein a substantially cylindrically shaped shield is placed around a longitudinally positioned activated filament so that the arc-maintaining and sustaining phenomena are confined substantially exclusively to the region within the shield, and wherein the shield serves as a heat conservator as well as a means for collecting any particles of cathode material which may be dislodged during starting and operation of the lamp. More particularly, I have found that there are optimum relationships to obtain these results. By proportioning the envelope inside diameter, the shield diameter, and the maximum transverse dimension of the filament, I not only prevent end-discoloration of the lamps and the formation of bands but also assure the conduction of electric current around the outside of the shield, between the shield and the envelope, to the far end of the shield. In order to assure that the positive column extends around the electrode shield and to maintain the arc-sustaining phenomena within the shield, I have found that the ratio of envelope inside diameter to the shield diameter should not be less than about 4, and the difference between the shield inside diameter and filament maximum transverse dimension should not be greater than about 3 mm. The spacing between the filament and the shield should be greater than the thickness of the cathode dark space established by the pressure and temperature of the ionizable medium employed. For example, in electrode assemblies which I have built, and for low pressure positive column fluorescent lamps having an operating pressure of mercury preferably within the range from 4 to 12 microns, shields ranging in diameter from about 3.0 to 4.5 mm. afford the above-stated advantages when used in conjunction with an activated filament having a maximum transverse dimension of about 1.5 millimeters. For shields and filaments of the above-stated values, the optimum range of spacing between the inside of the shield and the filament is 0.75 mm. to 1.5 mm. In this manner the discharge emanates from the far end of the shield thereby establishing uniform luminosity to the very ends of the tubular envelope.

The presence of the shield and the consequent collection thereby of any dislodged particles substantially eliminates spiraling. In addition, where the lamps constructed in accordance with my invention are used in instant-start type circuits, I have found that such lamps afford much longer life than lamps heretofore available and without incurring end-discoloration or spiraling.

For a better understanding of my invention reference may be had to the following description taken in connection with the accompanying drawings and its scope will be pointed out in the appended claims. Fig. 1 illustrates an embodiment of my invention as applied to a preheat type of circuit; Fig. 2 shows in detail one form of electrode construction wherein the shield for a filamentary electrode is open-ended; Fig. 3 is an end view of the electrode construction shown in Fig. 2; Figs. 4 and 5 represent modifications of my invention wherein the end of the electrode assembly facing the discharge is closed; Fig. 6 shows one manner in which lamps constructed in accordance with my invention may be connected to instant-start type circuits, and Figs. 8 and 9 show alternatives; and Fig. 7 shows an alternative preheat connection.

Referring now particularly to Fig. 1, I have there illustrated my invention as applied to a fluorescent lamp 1 preferably of the type having an elongated or tubular vitreous envelope 2, on the inner surface of which there is provided a fluorescent coating 3 extending to the lamp ends. At the ends of the lamp I provide electrode assemblies 4 and 5 constructed in accordance with my invention. Each of these electrodes comprises an activated filament 6, shown in detail in Fig. 2. The electrode assemblies are supported by lead-in wires 7—8, 9—10. Lead-in wires 7—10 are electrically connected to externally accessible contact pins 11—14, respectively, the pins being supported by bases 15 and 16. Of course, the lead-in wires 7—10 are supported by and sealed in suitable stems, not shown in Fig. 1 although a representative stem 17 and electrode mount structure are shown in Fig. 2.

Where it is desired to utilize the lamp construction in a preheat type of circuit, the circuit connections shown in Fig. 1 may be employed. In this arrangement the free end 18 of each of the filaments 6 is connected to a source of current, such as an alternating current source 19 through a switch 20 and a suitable ballast 21. A glow-type starting switch 22, such as that disclosed and claimed in U. S. Patent No. 2,329,134, granted on an application of L. R. Peters (assigned to the assignee of this application), may be connected across the pins 12 and 14 which in turn are connected to shields 23 and 24 of the electrode assemblies.

The details of the individual electrode assemblies 4 and 5 may be more fully appreciated by referring to the views shown in Figs. 2 and 3. The shield 23 is substantially cylindrical in shape, open at both ends, and surrounds the filament 6 throughout substantially its entire longitudinal length, the principal axis of the shield 23 being parallel to or coincident with the longitudinal axis of the lamp. The shield 23 may be constructed of a suitable material such as molybdenum or nickel and may be pressed to have the shape indicated, wherein two cooperating flanges 25 and 26 engage lead-in wire 8 to hold it in place for engagement at its inner end with the innermost end of filament 6. The flanges 25 and 26 may be secured by any suitable means, or they may be spot welded together to firmly hold the conductor 8.

The filament 6 may be made of a suitable refractory metal, such as tungsten, formed in a single, composite or multiple coiled configuration, coated with activating electron emissive material such as oxides of alkaline earth metals or mixtures thereof. Moreover, the filament may be constructed to include filamentary conductors of different sizes to closely retain the activating material between the convolutions of the conductors constituting the filament. One example of such a construction is that disclosed and claimed in U. S. Patent No. 2,306,925, granted December 29, 1942, upon an application of J. O. Aicher, and which is assigned to the assignee of this application.

The ionizable medium employed may be the usual filling of mercury and a starting gas such as argon. The amount of argon used may be such that a pressure of from 3 to 4 or 5 mm. is effective. A quantity of mercury somewhat in excess of that which will be vaporized during operation of the lamp may be used. The mercury pressure, of course, varies with temperature, and during operation is preferably from 4 to 12 microns and may range from 4 to 5 microns upwards toward 30 or more microns depending upon the design of the lamp and the operating conditions.

By virtue of the connection of the innermost end of the filament 6 to the shield 23, during operation as an anode, the current collected by the shield is transmitted in series relation through the filament 6 thereby serving to heat the filament and to maintain its temperature at a predetermined level. In addition, the shield serves as a heat conservator. I have found that by the proportioning of the shield transverse dimension or diameter the temperature level of the filament may be maintained at a relatively high value, minimizing the production of localized cathode spots and reducing the rate of electrode deterioration. Furthermore, by maintaining an optimum spacing between the inside diameter of the shield 23 and the maximum transverse dimension of the filament 6, the filament 6 is protected from bombardment due to the discharge during starting. By proportioning the aforestated spacing between the inside of the shield and the filament to lie within the range of about 1.5 to 3 mm., I have found that the cathode self-sustaining arc phenomenon takes place substantially exclusively within the shield 23.

With electrode assemblies having the above-stated spacing between the filament and the inside of the shield, the glow discharge during starting operations is confined substantially exclusively to the region within the shield, thereby reducing to a minimum the probability of any material dislodged during the starting operations from reaching the envelope. Moreover, this electrode assembly which I provide increases the rate at which the filament temperature attains that value at which minimum cathode voltage drop is attained, thereby further reducing any tendency toward rapid deterioration of the filament during starting. If the spacing between the filament and the inside of the shield is too small, the glow discharge will not be maintained exclusively within the shield during starting, and if the spacing between these two elements is too large the shield will not be effective as a means for obtaining rapid heating of the filament during starting, nor will it be as effective as a heat conservator during operation.

Another factor of some importance is the relationship between the inside diameter of the envelope 2 and the outside diameter of shield 23. I have found that this ratio should preferably be within the range from about 4 to 8 so that the arc conduction positive column takes place around the shield 23 to the far end thereof through an annular region wherein the longitudinal voltage gradient is not substantially in excess of that existing in the main part of the positive column of the arc and is preferably less than the voltage gradient along the filament. In this manner the arc discharge emanates from the far end of the shield 23, i. e., at the end facing the base 15 even though the innermost end is open.

Upon closure of switch 20, the supply voltage is impressed across glow switch 22, which almost immediately closes its contacts thereby establishing a circuit for energizing and preheating the filaments 6, which are connected in series. When switch 22 opens, due to the cooling of the bimetal member or members thereof, a surge or impulse of voltage is produced by the change of current through the inductive ballast 21, to establish an arc discharge between the electrode assemblies 4 and 5. Thereafter, the voltage across switch 22 is insufficient to cause further action thereof unless the lamp fails to start. Consequently the filaments are not energized through the external series starting circuit including switch 22, but the filaments are energized during half cycles of operation when the associated electrode assembly is positive, i. e., when it is operating as an anode. The shield serves to collect substantially all of the discharge current and by virtue of the connections this discharge current is transmitted in series relation through the filament 6 thereby serving to heat the filament, maintaining the temperature at a value or level which is optimum to meet the electron emission requirements during the subsequent half cycle of operation when that electrode assembly operates as a cathode.

During operation as a cathode, the self-sustaining arc phenomenon is confined substantially exclusively to the zone within the shield 23 or 24, so that the discharge emanates from the far end of the shield. This is true even though the innermost ends of the shield are open. As a result, the intensity of radiation throughout the lamp is quite uniform inasmuch as the luminous positive column is extended to the very ends of the tubular envelope. By using the optimum relationship described above for the relationship between the shield inside diameter and the filament diameter, the positive column extends to the far end of the shield.

While there are certain advantages in manufacturing cost and procedure by using shields which are open at both ends, it is to be appreciated that it is within the purview of my invention to employ shields wherein the end facing the main part of the discharge path is closed. For example, in Fig. 4 the shield 27 is crimped at one end 28 to completely close the opening at this end. In the modification shown in Fig. 5 a separate cap 29 is placed over the cylindrical part 30 of the shield. This cap may be clamped or welded to the main part of the shield.

Fig. 6 illustrates the manner in which lamps constructed in accordance with my invention may be connected to instant-start type circuits. A high leakage-reactance transformer 31 may be employed in the manner illustrated for energizing the lamp from an alternating current supply circuit 32. A switch 33 may be connected in series with the primary winding of the transformer 31 as indicated. When properly selected, such a transformer 31 connected in this manner gives a sufficiently high open-circuit voltage for starting the discharge, and a suitably lower operating voltage when discharge current is drawn from it after starting.

I have also found that the advantages of the cathode shields may be retained and the lamp voltage and wattage reduced somewhat and the efficiency increased, particularly in lamps of shorter length, by connecting the line, or current supply source, to the shield or by connecting both the cathode and shield to the line. Thus, for the preheat type circuit this can be done as shown in Fig. 7 by merely reversing the connections shown in Fig. 1 so that the current source 19 and ballast 21 are connected to the shields 23, 24 through pins 12 and 14 respectively, the starting switch 22 being connected to the cathodes through pins 11 and 13. Likewise, in the case of the instant-start type circuit, as shown in Fig. 8, the transformer 31 may be connected to the shields 23 and 24 through the base pins 12 and 14.

Fig. 9 illustrates the manner in which both the shield and the cathode are connected to the line in a circuit otherwise like that shown and described in connection with Fig. 6. To this end, the respective pairs of lead wires 7, 8 and 9, 10 are twisted or otherwise connected together and each pair is connected to a single contact terminal 34 (or 35) in the base 36 (or 37), thereby short-circuiting the cathode. The same result may be obtained where it is desired to retain the "bi-pin" type of base shown in Fig. 6 by providing the bases 15, 16 with short-circuiting members connected across and between the pairs of pins 11, 12 and 13, 14 respectively.

What I claim as new and desire to secure by Letters Patent of the United States is:

1. In a low pressure positive column electric discharge lamp, the combination comprising an elongated envelope, fluorescent material on said envelope, an ionizable medium capable of supporting an arc discharge and comprising mercury and a gas having a pressure not greater than about 5 mm., and electrode means including an electrode assembly at one end of said envelope for operating alternately as an anode and a cathode and comprising an activated filament extending longitudinally of said envelope and an elongated unactivated metallic shield of substantially cylindrical shape electrically connected to and surrounding said filament for substantially its entire length and having at least its far end open and located adjacent to the associated end of the envelope, the spacing between the inside of the shield and said filament lying within the range of about 0.75 to 1.5 mm., said shield having a diameter of approximately 3 to 4.5 mm., and the ratio of the inside diameter of the envelope to the outside diameter of the shield being within the range from about 4 to 8 to protect the filament from bombardment upon starting and to establish an outer annular region for arc conduction outside said shield wherein the longitudinal voltage gradient is not substantially in excess of that existing in the main part of the positive column of the arc and is less than the voltage gradient along said filament so that the arc discharge emanates from the far end of said shield, said lamp being proportioned for operation at its designed loading with a mercury vapor pressure of the order of 4 to 12 microns.

2. In a low pressure positive column electric discharge lamp, the combination comprising an elongated envelope, fluorescent material on said envelope, an ionizable medium within said envelope capable of supporting an arc discharge and comprising mercury and a gas having a pressure not greater than about 5 mm., electrode means including an electrode assembly at one end thereof comprising a filamentary activated electrode having its longitudinal axis parallel to the main axis of the envelope, and an open-ended unactivated metallic shield of substantially cylindrical shape about said electrode, the inner end of said filament being electrically connected to said shield, and the ratio of the inside diameter of said envelope to the outside diameter of said shield being within the range from about 4 to 8 to protect the filament from bombardment during starting and to establish an outer annular region for arc conduction outside said shield having a voltage gradient not substantially in excess of that existing in the main part of the positive column of the discharge so that the arc discharge emanates from the far end of said shield, said lamp being proportioned for operation at its designed loading with a mercury vapor pressure of the order of 4 to 12 microns.

3. In a low pressure positive column electric discharge lamp for operation on alternating current, the combination comprising an elongated envelope, fluorescent material on said envelope, an ionizable medium within said envelope capable of supporting an arc discharge and comprising mercury and a gas having a pressure not greater than about 5 mm., and a pair of electrode assemblies located at each end of said envelope for operating alternately as anodes and cathodes and each comprising an activated filament having its principal axis longitudinal of said envelope and an open-ended unactivated metallic shield of substantially cylindrical shape surrounding the associated filament for substantially its entire length, the inner end of said filament being electrically connected to the associated shield and the other end of the filament being free for connection to an alternating current source, the ratio of the inside diameter of said envelope to the outside diameter of said shield being within the range from about 4 to 8 to protect the filament from bombardment during starting and to establish an outer annular region between the shield and the envelope for arc conduction wherein the longitudinal voltage gradient is not substantially greater than that existing in the main part of the positive column of the arc so that the arc discharge emanates from the far end of said shield, said lamp being proportioned for operation at its designed loading with a mercury vapor pressure of the order of 4 to 12 microns.

4. In a low pressure positive column electric discharge lamp for operation on alternating current, the combination comprising an elongated envelope, fluorescent material on said envelope, an ionizable medium within said envelope capable of supporting an arc discharge and comprising mercury and a gas having a pressure not greater than about 5 mm., and a pair of electrode assemblies at each end of said envelope and each comprising a filamentary activated electrode extending longitudinally of said envelope, an open-ended cylindrical unactivated metallic shield about said filament electrically connected to the innermost end of said filament, the spacing between said filament and said shield being greater than the thickness of the cathode dark space for the operating pressure and temperature of said medum and the ratio of the inside diameter of the envelope to the outside diameter of the shield being within the range from about 4 to 8 so that arc conduction takes place substantially exclusively along the outside of the shield emanating from the far end of the shield, said lamp being proportioned for operation at its designed loading with a mercury vapor pressure of the order of 4 to 12 microns.

5. In a low pressure positive column electric discharge lamp for operation on alternating current, the combination comprising an elongated envelope, fluorescent material on said envelope, an ionizable medium within said envelope capable of supporting an arc discharge and comprising mercury and a gas having a pressure not greater than about 5 mm., and a pair of electrode assemblies at each end of said envelope for operating alternately as anodes and cathodes and each comprising an activated filament extending longitudinally of said envelope and an elongated unactivated metallic shield of substantially cylindrical shape surrounding said filament for substantially its entire length, the innermost end of each filament being electrically connected to the associated shield so that during operation as an anode the arc current is conducted in series through the filament, the difference between the inside diameter of the shield and the maximum transverse dimension of the filament being within the range of about 1.5 to 3.0 mm. to maintain the glow discharge during starting within said shield, said lamp being proportioned for operation at its designed loading with a mercury vapor pressure of the order of 4 to 12 microns.

6. In a low pressure positive column electric discharge lamp for operation on alternating current, the combination comprising an elongated envelope, fluorescent material on said envelope, an ionizable medium within said envelope capable of supporting an arc discharge and comprising mercury and a gas having a pressure not greater than about 5 mm., and a pair of electrode assemblies at each end of said envelope for operating alternately as anodes and cathodes and each comprising an activated filament extending longitudinally of said envelope and elongated unactivated metallic shield of substantially cylindrical shape electrically connected to and surrounding said filament for substantially its entire length, said shield having a diameter of approximately 3 to 4.5 mm., the ratio of the inside diameter of the envelope to the outside diameter of the shield being not less than 4 in order to assure that the positive column extends around the electrode shield and the spacing between the shield and the filament being not greater than about 1.5 mm. in order to maintain the arc-sustaining phenomena within the shield, said lamp being proportioned for operation at its designed loading with a mercury vapor pressure of the order of 4 to 12 microns.

7. In a low pressure positive column electric discharge lamp for operation on alternating current, the combination comprising an elongated envelope, fluorescent material on said envelope, an ionizable medium within said envelope capable of supporting an arc discharge and comprising mercury and a gas having a pressure not greater than about 5 mm., and a pair of electrode assemblies at each end of said envelope for operating alternately as anodes and cathodes and each comprising an activated filament extending longitudinally of said envelope and elongated unactivated metallic shield of substantially cylindrical shape surrounding said filament for substantially its entire length, each of said filaments having both ends thereof electrically connected to the associated shield, the ratio of the inside diameter of the envelope to the outside diameter of the shield being not less than 4 in order to assure that the positive column extends around the electrode shield and the spacing between the shield and the filament being not greater than about 1.5 mm. in order to maintain the arc-sustaining phenomena within the shield, said lamp being proportioned for operation at its designed loading with a mercury vapor pressure of the order of 4 to 12 microns.

8. In a low pressure positive column electric discharge lamp, the combination comprising an elongated envelope, fluorescent material on said envelope, an ionizable medium capable of supporting an arc discharge and comprising mercury and a gas having a pressure not greater than about 5 mm., and electrode means including an electrode assembly at one end of said envelope for operating alternately as an anode and a cathode and comprising an activated filament extending longitudinally of said envelope and an elongated unactivated metallic shield of substantially cylindrical shape surrounding said filament for substantially its entire length, said filament having both ends thereof electrically connected to said shield, said shield having a diameter of approximately 3 to 4.5 mm., the spacing between the inside of the shield and said filament lying within the range of about 0.75 to 1.5 mm., and the ratio of the inside diameter of the envelope to the outside diameter of the shield being within the range from about 4 to 8, said lamp being proportioned for operation at its designed loading with a mercury vapor pressure of the order of 4 to 12 microns.

9. In a low pressure positive column electric discharge lamp, the combination comprising an elongated envelope, fluorescent material on said envelope, an ionizable medium capable of supporting an arc discharge and comprising mercury and a gas having a pressure not greater than about 5 mm., and electrode means including an electrode assembly at one end of said envelope for operating alternately as an anode and a cathode and comprising an activated filament extending longitudinally of said envelope and an elongated unactivated metallic shield of substantially cylindrical shape surrounding said filament for substantially its entire length, said filament having one end thereof electrically connected to said shield, and means for connecting said shield to a current source, the spacing between the inside of the shield and said filament lying within the range of about 0.75 to 1.5 mm., and the ratio of the inside diameter of the envelope to the outside diameter of the shield being within the range from about 4 to 8, said lamp being proportioned for operation at its designed loading with a mercury vapor pressure of the order of 4 to 12 microns.

10. In a low pressure positive column electric discharge lamp, the combination comprising an elongated envelope, fluorescent material on said envelope, an ionizable medium capable of supporting an arc discharge and comprising mercury and a gas having a pressure not greater than about 5 mm., and electrode means including an electrode assembly at one end of said envelope for operating alternately as an anode and a cathode and comprising an activated filament extending longitudinally of said envelope and an elongated shield of substantially cylindrical shape electrically connected to and surrounding said filament for substantially its entire length and having at least its far end open and located adjacent to the associated end of the envelope, the cathode being coiled to a diameter of approximately 1.5 mm. and the shield having a diameter of about 3 to 4.5 mm., and the ratio of the inside diameter of the envelope to the outside diameter of the shield being within the range from about 4 to 8 to protect the filament from bombardment upon starting and to establish an outer annular region for arc conduction outside said shield wherein the longitudinal voltage gradient is not substantially in excess of that existing in the main part of the positive column of the arc and is less than the voltage gradient along said filament so that the arc discharge emanates from the far end of said shield, said lamp being proportioned for operation at its designed loading with a mercury vapor pressure of the order of 4 to 12 microns.

11. An electrode mount structure for gaseous electric discharge devices comprising a stem having a pair of lead-in wires extending therethrough on opposite sides of the axis of said stem, one of said wires extending longitudinally and substantially parallel to the axis of said stem and having its inner end bent laterally toward the stem axis, the other wire also having its inner end bent laterally toward the stem axis at a point closer to the stem than the said one wire, an activated coiled filamentary cathode connected to and between the inner ends of said wires and extending substantially axially of said stem, and an unactivated sheet metal cylindrical shield concentric with and closely surrounding said cathode, said shield being longitudinally divided along one side by flanges extending outwardly therefrom and joined securely to the longitudinally extending portion of said one wire.

WILFORD J. WINNINGHOFF.

REFERENCES CITED

The following references are of record in the file of this patent:

UNITED STATES PATENTS

| Number | Name | Date |
|---|---|---|
| 1,958,239 | Found | May 8, 1934 |
| 1,980,534 | Kirsten | Nov. 13, 1934 |
| 1,984,483 | Kenty | Dec. 18, 1934 |
| 2,008,066 | Ende | July 16, 1935 |
| 2,009,839 | Found | July 30, 1935 |
| 2,028,548 | Kirsten | Jan. 21, 1936 |
| 2,107,945 | Hull | Feb. 8, 1938 |
| 2,233,741 | Kirsten | Mar. 4, 1941 |
| 2,236,290 | Hull | Mar. 25, 1941 |
| 2,264,055 | Stocker | Nov. 25, 1941 |
| 2,272,486 | Stocker | Feb. 10, 1942 |
| 2,283,216 | Lowry | May 19, 1942 |
| 2,294,623 | Lebrun | Sept. 1, 1942 |
| 2,307,971 | Stirnkorb | Jan. 12, 1943 |
| 2,496,374 | Boucher | Feb. 7, 1950 |